United States Patent [19]

Ishihata et al.

[11] Patent Number: 5,013,776
[45] Date of Patent: May 7, 1991

[54] FLAME-RETARDANT POLYCARBONATE RESIN COMPOSITION

[75] Inventors: Kouji Ishihata, Sagamiha; Youichi Hironaka, Mihara; Hisanaga Shimizu, Mihara; Kazuo Kitamura, Mihara; Takeshi Imagawa, Mihara, all of Japan

[73] Assignee: Teijin Chemicals, Ltd., Tokyo, Japan

[21] Appl. No.: 352,340

[22] Filed: May 16, 1989

[30] Foreign Application Priority Data

May 20, 1988 [JP] Japan ................................ 63-122070
Aug. 9, 1988 [JP] Japan ................................ 63-197093
Sep. 8, 1988 [JP] Japan ................................ 63-223398

[51] Int. Cl.$^5$ ............................................. C08K 5/527
[52] U.S. Cl. ................................... 524/118; 524/141; 524/142; 524/143; 524/117
[58] Field of Search ............... 524/141, 142, 143, 117, 524/118

[56] References Cited

U.S. PATENT DOCUMENTS 4,649,168  3/1987  Kress et al. ........................ 524/130
4,663,374  5/1987  Sonoda et al. ...................... 524/128

Primary Examiner—Veronica P. Hoke
Attorney, Agent, or Firm—Sherman and Shalloway

[57] ABSTRACT

A flame-retardant polycarbonate resin composition comprising 100 parts by weight of a polycarbonate resin and 0.001 to 5.0 parts by weight of at least one metal salt of an organic phosphoric acid ester represented by the following general formula [I]

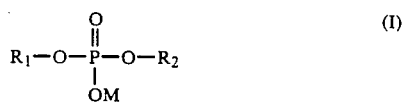

wherein $R_1$ and $R_2$, independently from each other, represent an alkyl or aryl group which is substituted or unsubstituted by halogen, at least one of $R_1$ and $R_2$ is an aryl group and when both $R_1$ and $R_2$ are aryl groups, they may be bonded to each other either directly or through an alkylene group or may form one fused ring, and M represents an alkali metal, and optionally 0.01 to 2.0 parts by weight of a micro-fibrous polytetrafluoroethylene.

6 Claims, No Drawings

FLAME-RETARDANT POLYCARBONATE RESIN COMPOSITION

This invention relates to a flame-retardant polycarbonate resin composition, particularly to a nondripping flame-retardant polycarbonate resin composition.

Many methods have been proposed for rendering polycarbonate resins flame-retardant. Many of them involve the addition of halogen compounds. For example, U.S. Pat. No. 3,846,469 discloses the addition of isopropylidene bis(2,6-dihalo-phenylene)bis(polyhalophenyl)carbonates, and U.S. Pat. No. 3,855,277, the addition of low molecular weight poly(halogenated dihydrid phenol) carbonates. U.S. Pat. Nos. 4,001,175, 4,039,509, 4,067,846, 4,073,768, 4,092,291, and 4,104,245 describe the addition of aromatic sulfonate salts. U.S. Pat. No. 4,317,769 sets forth the addition of metal salts of aromatic phosphonic acid and metal salts of halogenated aromatic phosphonic acid.

These flame retardants can prevent flaming of the polycarbonate resins, but to shorten the flame time and prevent dripping of the molten resin during flaming, they have to be added in considerably large amounts. Accordingly, such flame retardants have the defect of reducing the thermal stability of the polycarbonate resins during molding, generating corrosive or toxic gases during molding or burning, or reducing the transparency of the polycarbonate resins. Furthermore, even if the addition of these flame retardants can prevent burning of the polycarbonate resins with flames, they cannot obviate the risk of the high temperature particles of the polycarbonate resin dripping and igniting the material immediately below the resin.

It is one object of this invention, therefore, to provide a flame-retardant polycarbonate resin composition free from these defects.

Another object of this invention is to provide a flame-retardant polycarbonate resin composition of which particles at high temperatures during burning do not drip, or hardly drip.

Investigations of the present inventors have led to the discovery that these objects of the invention can be achieved by a polycarbonate resin composition comprising a polycarbonate resin, a metal salt of an organic phosphoric acid ester or a metal salt of a halogenated organic phosphoric acid ester, and optionally a specific polytetrafluoroethylene.

According to this invention, there is thus provided a flame-retardant polycarbonate resin composition comprising 100 parts by weight of a polycarbonate resin and 0.001 to 5.0 parts by weight of at least one metal salt of an organic phosphoric acid ester represented by the following general formula [I]

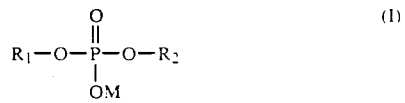

wherein $R_1$ and $R_2$, independently from each other, represent an alkyl or aryl group which is substituted or unsubstituted by halogen, at least one of $R_1$ and $R_2$ is an aryl group and when both $R_1$ and $R_2$ are aryl groups, they may be bonded to each other either directly or through an alkylene group or may form one fused ring, and M represents an alkali metal, and optionally 0.01 to 2.0 parts by weight of a microfibrous polytetrafluoroethylene.

The polycarbonate resin used in this invention can be produced by reacting a dihydric phenol and a carbonate precursor by a solution method or a melting method. Typical examples of the dihydric phenol include 2,2-bis(4-hydroxyphenyl)propane (bisphenol A), bis(4-hydroxyphenyl)methane, 2,2-bis(4-hydroxy-3,5-dimethylphenyl)propane, 2,2-bis(4-hydroxy-3-methylphenyl)propane, bis(4-hydroxyphenyl)sulfide, bis(4-hydroxyphenyl)sulfone. Preferred dihydric phenols consist mainly of bis(4-hydroxyphenyl)alkanes, especially bisphenol A. On the other hand, carbonyl halides, carbonyl esters and haloformates may be cited as examples of the carbonate precursor. Specifically, they are phosgene, diphenyl carbonate, haloformates of dihydric phenols, and mixtures of these. In the production of the polycarbonate resin, the dihydric phenols may be used singly or as a combination of two or more of them. Two or more polycarbonate resins may be used in combination.

The polycarbonate resin has a viscosity average molecular weight of generally 10,000 to 100,000, preferably 15,000 to 60,000. In the production of polycarbonate resin having these molecular weights, a suitable molecular weight controlling agent, a branching agent for improvement of processability and a catalyst for promotion of the reaction may be added.

The metal salt of the organic phosphoric acid ester used in this invention is a compound represented by the general formula [I]

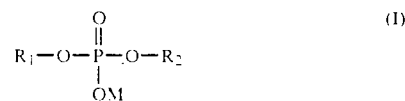

In the formula, M represents an alkali metal, preferably sodium or potassium. $R_1$ and $R_2$, independently from each other, represent an alkyl or aryl group. At least one of $R_1$ and $R_2$ is an aryl group, and at least one of $R_1$ and $R_2$ may be substituted by halogen. Examples of preferred alkyl or aryl groups are methyl, ethyl, isopropyl, t-butyl, n-nonyl and phenyl groups. When both $R_1$ and $R_2$ are aryl groups, they may be bonded to each other either directly or via an alkylene group, or may form one fused ring. Examples are shown below.

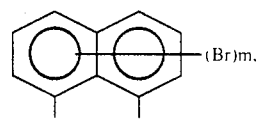

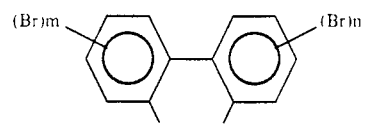

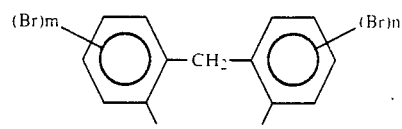

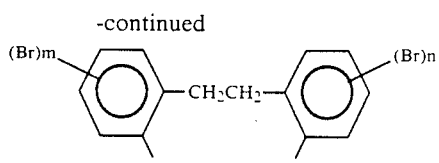

(m and n are 0 or a positive integer.)

The metal salt of an organic phosphate ester represented by general formula [I] is easily available, for example, from Adeka-Argus Chemical Co., Ltd. as nucleating agents (tradename NA-10 and NA-11) for crystalline polymers. The metal salts of a halogenated organic phosphate ester of general formula [I] may be easily synthesized, for example, in accordance with the disclosure of U.S. Pat. No. 4,170,614.

The amount of the the metal salt of the (halogenated) organic phosphoric acid ester to be incorporated is 0.001 to 5.0 parts by weight, preferably 0.005 to 2.0 parts by weight, per 100 parts by weight of the polycarbonate resin. If it is less than 0.001 part by weight, the flame retarding effect is insufficient. If it exceeds 5.0 parts by weight, the thermal stability of the composition is reduced, and rather its flammability increases. The fire retarding effect can be greatly increased by using it in combination with a conventional flame retardant, and the amounts of both can be drastically decreased.

The micro-fibrous polytetrafluoroethylene used in this invention is a known substance described, for example, in U.S. Pat. No. 3,005,795, and is classified as type 3 in ASTM standards. Such a micro-fibrous polytetrafluoroethylene is commercially available as Teflon 6J from Du Pont-Mitsui Fluorochemicals Co., Ltd. and as Polyflon D-1(aqueous dispersion) from Daikin Industries Ltd., and are easily available.

The amount of the polytetrafluoroethylene to be incorporated is 0.01 to 2.0 parts by weight per 100 parts by weight of the polycarbonate resin. Amounts of less than 0.01 part by weight are insufficient for imparting non-dripping property during burning. If, on the other hand, it exceeds 2.0 parts by weight, the viscosity of the resin is markedly increased, and the resulting resin composition is not desirable as a molding material.

The resin composition of this invention may be prepared by any desired method. For example, the polycarbonate, the organic phosphate ester metal salt and optionally the polytetrafluoroethylene, all in powder form, may be dry-blended by using a supermixer, a tumbler or the like. Alternatively, it may be prepared by adding an aqueous solution of the organic phosphate ester metal salt to the polycarbonate in powder form, drying the mixture, and optionally mixing the dried product with the polytetrafluoroethylene as a powder. It is also possible to add an aqueous dispersion of the polytetrafluoroethylene to the polycarbonate in powder form, dry the mixture and then mix the dried product with the organic phosphate ester metal salt in powder form.

The resulting composition, either as such or after it is pelletized by an extruder, may be molded by, for example, injection molding, extrusion or compression molding.

As required, additives such as stabilizers, mold releasing agents, lubricants, antistatic agents, ultraviolet absorbers and organic halogen compound-type flame retardants may be added to the composition of this invention. Where the resulting composition does not require transparency, it is possible to add a fluorine containing polymer, a silicone-type polymer, an inorganic filler, glass fibers, carbon fibers, etc.

In a flame test in UL-94, the composition of this invention shows excellent flame retardancy. When the fluorine-containing polymer or glass fibers are not incorporated, the resin composition has excellent transparency. The composition of the invention comprising the micro-fibrous polytetrafluoroethylene has slightly inferior transparency, but shows excellent flame retardancy rated V-1 or V-0 in the UL-94 flame test, and is nondripping. Since the composition of this invention has better properties than known flame-retardant polycarbonate resin compositions, it can be used in a wide range of applications.

The following examples illustrate the present invention specifically.

EXAMPLES 1-5 AND COMPARATIVE EXAMPLES 1-5

One hundred parts by weight of a pre-dried aromatic polycarbonate resin (Panlite L-1250, a product of Teijin Chemicals Ltd.) and each of the additives in the amounts indicated in Table 1 were pre-mixed by a V-type blender. Immediately then, the mixture was extruded by a single-screw vent-type extruder (VSK-30 supplied by Nakatani Co., Ltd.) kept at a cylinder temperature of 280° C. and pelletized.

The pellets were dried at 120° C. for 6 hours, and molded into test pieces having a size of 5"×½"×1/16" and 5"×½"×⅛" at a cylinder temperature of 290° C. and a mold temperature of 90° C. by using an injection molding machine (Sycap S 480/150 supplied by Sumitomo Heavy Industries Ltd.).

These test pieces were subjected to the flame test set forth in UL-94. The appearances of the pieces were evaluated visually. The results are shown in Table 1.

TABLE 1

| | Additive | | Thickness of the test piece (inch) | Flame time (seconds) | | Average number of drippings | UL-94 rating | Appearance of the test piece |
|---|---|---|---|---|---|---|---|---|
| | Type | Parts by weight | | Maximum | Average | | | |
| Ex. 1 | I | 0.1 | ⅛ | 8 | 3.9 | 0 | V-0 | transparent |
| Ex. 2 | I | 0.01 | ⅛ | 8 | 4.1 | 0 | V-0 | " |
| | P | 0.5 | | | | | | |
| Ex. 3 | II | 0.1 | ⅛ | 8 | 4.5 | 0 | V-0 | " |
| CEx. 1 | — | — | ⅛ | 25 | 20.5 | 2 | V-2 | " |
| CEx. 2 | I | 6.0 | ⅛ | 142 | 64 | 2.5 | — | hazy |
| CEx. 3 | P | 0.5 | ⅛ | 20 | 8.9 | 0.5 | V-2 | transparent |
| Ex. 4 | II | 0.1 | 1/16 | 6 | 3.5 | 0 | V-0 | — |
| | P | 0.5 | | | | | | |
| | Q | 10.0 | | | | | | |
| CEx. 4 | P | 0.5 | 1/16 | 20 | 15.5 | 0.5 | V-2 | — |
| | Q | 10.0 | | | | | | |

TABLE 1-continued

| | Additive | | Thickness of the test piece (inch) | Flame time (seconds) | | Average number of drippings | UL-94 rating | Appearance of the test piece |
|---|---|---|---|---|---|---|---|---|
| | Type | Parts by weight | | Maximum | Average | | | |
| Ex. 5 | II | 0.01 | ⅛ | 4 | 2.5 | 0 | V-0 | non-transparent |
| | P | 10.0 | | | | | | |
| | R | 0.1 | | | | | | |
| CEx. 5 | P | 10.0 | ⅛ | 6 | 3.0 | 0.3 | V-2 | non-transparent |
| | R | 0.1 | | | | | | |

Ex. = Example. CEx. = Comparative Example

The symbols showing the additives given in Table 1 were the following compounds.

I: sodium bis(4-t-butylphenyl)phosphate of the following formula (NA-10 produced by Adeka-Argus Chemical Co., Ltd.)

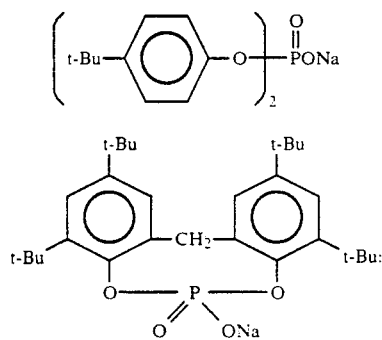

II

P: polycarbonate oligomer of tetrabromobisphenol A (FG-7000, a product of Teijin Chemicals Ltd.)

Q: glass fibers (chopped strand, a product of Nitto Boseki Co., Ltd.)

R: vinylidene fluoride/tetrafluoroethylene copolymer rubber (Daiel G 901, a product of Daikin Industries Ltd.)

The data given in Table 1 lead to the following conclusions.

(1) The products of Examples 1 and 3 which contained the organic phosphate ester metal salts showed excellent transparency, and better flame retardancy than the product of Comparative Example 1 which contained no additive.

(2) The product of Comparative Example 2 in which the amount of the metal salt of an organic phosphate ester is larger than the specified value is hazy. It has poor flame retardancy and is susceptible to inflammation.

(3) The product of Comparative Example 3 containing only the conventional flame retardant (P) does not show appreciable flame retardancy, but the product of Example 2 which further contained small amount of the metal salt of an organic phosphate ester has much improved flame retardancy.

(4) The products of Examples 4 and 5 contained the resin and a very small amount of the metal salt of an organic phosphate ester together with the brominated oligocarbonate (P) and glass fibers (Q) or the fluorine-containing polymer (R) have much improved flame retardancy over the products of Comparative Examples 4 and 5 containing only the resin and the oligocarbonate (P) and glass fibers (Q) or the fluorine-containing polymer (R).

EXAMPLES 6-10 AND COMPARATIVE EXAMPLES 6-10

One hundred parts by weight of a pre-dried aromatic polycarbonate resin (Panlite L-1250, a product of Teijin Chemicals Ltd.) and each of the additives in the amounts indicated in Table 2 were pre-mixed by a V-type blender. Immediately then, the mixture was extruded by a single-screw vent-type extruder (VSK-30 supplied by Nakatani Co., Ltd.) kept at a cylinder temperature of 280° C. and pelletized.

The pellets were dried at 120° C. for 6 hours, and molded into test pieces having a size of 5"×½"×1/16" and 5"×½"×⅛" at a cylinder temperature of 290° C. and a mold temperature of 90° C. by using an injection molding machine (Sycap S 480/150 supplied by Sumitomo Heavy Industries Ltd.).

These test pieces were subjected to the flame test set forth in UL-94. The appearances of the pieces were evaluated visually. The results are shown in Table 2.

TABLE 2

| | Additive | | Thickness of the test piece (inch) | Flame time (seconds) | | Average number of drippings | UL-94 rating | Appearance of the test piece |
|---|---|---|---|---|---|---|---|---|
| | Type | Parts by weight | | Maximum | Average | | | |
| Ex. 6 | III | 0.01 | ⅛ | 17.5 | 7.5 | 0 | V-1 | transparent |
| Ex. 7 | III | 0.01 | ⅛ | 8.0 | 5.0 | 0 | V-0 | " |
| | I | 0.5 | | | | | | |
| Ex. 8 | IV | 0.01 | ⅛ | 7.0 | 4.5 | 0 | V-0 | " |
| CEx. 6* | — | — | ⅛ | 25 | 20.5 | 2 | V-2 | " |
| CEx. 7 | III | 6.0 | ⅛ | 131 | 41 | 2.5 | — | hazy |
| CEx. 8** | P | 0.5 | ⅛ | 20 | 8.9 | 0.5 | V-2 | transparent |
| Ex. 9 | III | 0.1 | 1/16 | 4.7 | 3.4 | 0 | V-0 | — |
| | P | 0.5 | | | | | | |
| | Q | 10 | | | | | | |
| CEx. 9*** | P | 0.5 | 1/16 | 20 | 15.5 | 0.5 | V-2 | — |
| | Q | 10 | | | | | | |
| Ex. 10 | III | 0.1 | ⅛ | 5 | 3.0 | 0 | V-0 | non-transparent |
| | P | 0.5 | | | | | | |
| | R | 0.1 | | | | | | |
| CEx. 10 | P | 0.5 | ⅛ | 6 | 3.0 | 0.3 | V-2 | non- |

TABLE 2-continued

| | Additive | | Thickness of the test piece (inch) | Flame time (seconds) | | Average number of drippings | UL-94 rating | Appearance of the test piece |
|---|---|---|---|---|---|---|---|---|
| Type | Parts by weight | | | Maximum | Average | | | |
| | R | 0.1 | | | | | | transparent |

*CEx. 6 is the same as CEx. 1.
**CEx. 8 is the same as CEx. 3.
***CEx. 9 is the same as CEx. 4.

The symbols given in Table 2 for representing additives show the following substances.

I, P, Q and R: same as indicated below Table 1.

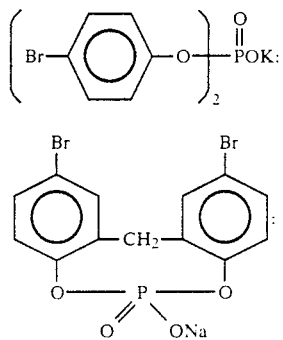

III

IV

The data given in Table 2 lead to the following conclusion.

(1) The products of Examples 6 to 8 containing the metal salt of an organic phosphate ester showed excellent transparency, and better fire retardancy than the product of Comparative Example 6 containing no additive.

(2) The product of Comparative Example 7 in which the amount of the metal salt of an organic phosphate ester is larger than the specified value is hazy. It has poor flame retardancy and is susceptible to inflammation.

(3) The products of Examples 9 and 10 containing the resin and a very small amount of the metal salt of an organic phosphate ester together with the brominated oligocarbonate (P) and glass fibers (Q) or the fluorine-containing polymer (R) have much improved flame retardancy over the products of Comparative Examples 9 and 10 containing only the resin and the oligocarbonate (P) and glass fibers (Q) or the fluorine-containing polymer (R).

EXAMPLES 11–14 AND COMPARATIVE EXAMPLES 11–13

One hundred parts by weight of a pre-dried aromatic polycarbonate resin (Panlite L-1250, a product of Teijin Chemicals Ltd.) and each of the additives in the amounts indicated in Table 3 were pre-mixed by a V-type blender. Immediately then, the mixture was extruded by a single-screw vent-type extruder (VSK-30 supplied by Nakatani Co., Ltd.) kept at a cylinder temperature of 280° C. and pelletized.

The pellets were dried at 120° C. for 6 hours, and molded into a UL-94 flame test piece having a size of 5″×½″×1/16″ at a cylinder temperature of 290° C. and a mold temperature of 90° C. by using an injection molding machine (Sycap S 480/150 supplied by Sumitomo Heavy Industries Ltd.).

The test pieces were subjected to the flame test set forth in UL-94. The appearance of the test piece was evaluated visually. The results are shown in Table 3.

TABLE 3

| | Additive | | Thickness of the test piece (in.) | Flame time (seconds) | | Average number of drippings | UL-94 rating |
|---|---|---|---|---|---|---|---|
| | Type | Parts by weight | | Maximum | Average | | |
| Ex. 11 | I | 0.05 | 1/16 | 9.8 | 4.5 | 0 | V-0 |
| | X | 0.5 | | | | | |
| Ex. 12 | II | 0.1 | 1/16 | 8.0 | 4.0 | 0 | V-0 |
| | X | 0.5 | | | | | |
| Ex. 13 | III | 0.1 | 1/16 | 7.5 | 3.8 | | V-0 |
| | Y | 0.5 | | | | | |
| CEx. 11* | — | — | 1/16 | 26 | 21.4 | 2 | V-2 |
| CEx. 12 | X | 0.5 | 1/16 | 22.2 | 16.8 | 0.5 | V-2 |
| Ex. 14 | I | 0.05 | 1/16 | 5.0 | 3.8 | 0 | V-0 |
| | P | 0.1 | | | | | |
| | X | 0.5 | | | | | |
| CEx. 13 | P | 0.1 | 1/16 | 22.5 | 16.5 | 1.5 | V-2 |
| | X | 0.5 | | | | | |

*CEx. 11 is the same as CEx. 1 and CEx. 6 given hereinabove.

The symbols given in Table 3 for representing additives show the following compounds.

I, II, III and P: same as indicated below Tables 1 and 2.

X: polytetrafluoroethylene (Teflon 6J, a product of Du Pont-Mitsui Fluorochemicals Co.)

Y: polytetrafluoroethylene (Polyflon F-103, a product of Daikin Industries Ltd.)

The data given in Table 3 lead to the following conclusions.

(1) The product of Comparative Example 11 containing no additive dripped during the flame test and could not be accepted in UL standards 94 V-1 and V-0.

(2) The products of Examples 11 to 13 containing micro-fibrous polytetrafluoroethylene together with the metal salt of an organic phosphoric acid ester can avoid dripping and satisfies the UL standard 94 V-0.

(3) The product of Comparative Example 13 containing both the brominated polycarbonate oligomer (P)

and the microfibrous polytetrafluoroethylene (X) has much the same level of the flame time as the product of Comparative Example 12 containing only (X) as the additive.

(4) The product of Example 14 which resulted from the addition of the metal salt of an organic phosphate ester to the product of Comparative Example 13 has much improved flame retardancy.

We claim:

1. A flame-retardant polycarbonate resin composition comprising 100 parts by weight of at least one metal salt of an organic phosphoric acid ester represented by the following general formula

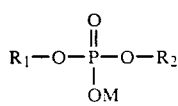

wherein $R_1$ and $R_2$, independently from each other, represent an aryl group which is unsubstituted or substituted by halogen or lower alkyl group and are bonded to each other through an alkylene group, and M represents an alkali metal.

2. The flame-retardant polycarbonate resin composition of claim 1 which further comprises 0.01 to 2.0 parts by weight of a micro-fibrous polytetrafluoroethylene.

3. The flame retardant polycarbonate resin composition of claim 1 wherein the metal salt of an organic phosphoric acid ester is the compound of formula

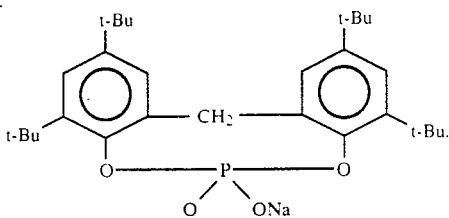

4. The flame retardant polycarbonate resin composition of claim 1 wherein the metal salt of an organic phosphoric acid ester is the compound of formula

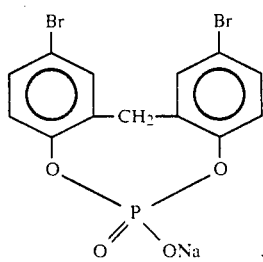

5. The flame retardant polycarbonate resin composition of claim 1 wherein the polycarbonate resin has a viscosity average molecular weight of from about 15,000 to 60,000.

6. The flame retardant polycarbonate resin composition of claim 1 which contains from about 0.005 to 2.0 parts by weight of the at least one metal salt of an organic phosphoric acid ester, per 100 parts by weight of the polycarbonate resin.

* * * * *